Nov. 9, 1937.  D. D. DEMAREST  2,098,721
RESILIENT FASTENER
Filed Nov. 30, 1936
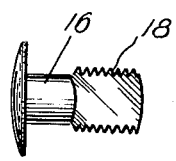
FIG.1.
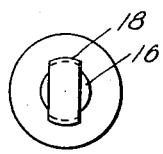
FIG.2.
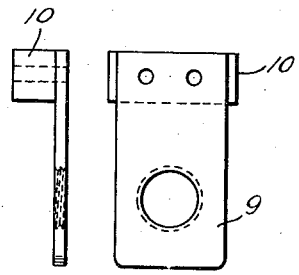
FIG.4.  FIG.5.
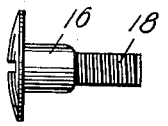
FIG.3.
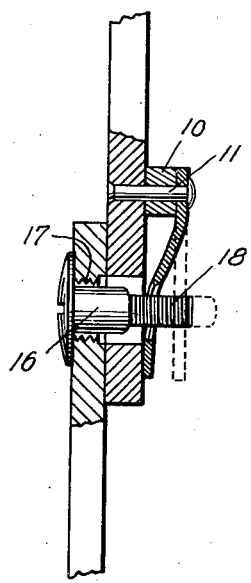
FIG.6.
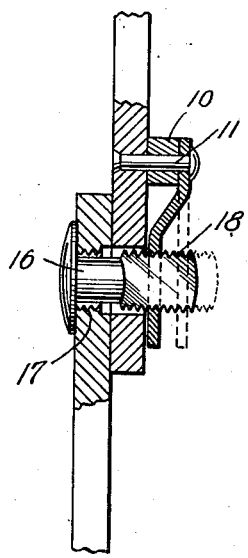
FIG.7.
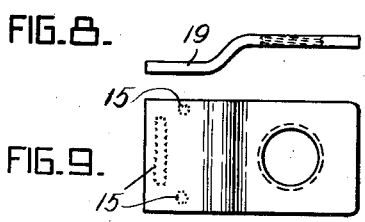
FIG.8.
FIG.9.
Daniel Douglas Demarest
INVENTOR Patented Nov. 9, 1937

2,098,721

UNITED STATES PATENT OFFICE 2,098,721

RESILIENT FASTENER

Daniel Douglas Demarest, Little Neck, N. Y.

Application November 30, 1936, Serial No. 113,482

10 Claims. (Cl. 85—1)

My invention relates to improvements in resilient fasteners, and provides a simple means of securing together elements that may require to be separated frequently.

Latch and bayonet type fasteners which permit rapid removal and replacement are inherently not adjustable and adapt themselves to only slight variations of position of the elements fastened. Screws and nuts, on the other hand, while adjustable, are difficult to keep tight and, if lockwashers are employed, repeated removals injure the surfaces that are in contact with the washers.

This fastener comprises a male member, such as a screw or bolt, and a female member with a continuous though possibly deformed thread. The two members are secured to each other in the ordinary screw and nut manner; but as this fastener is tightened there are positions in each revolution at which the relative rotation of the screw and nut is opposed by a greater force than at other positions. Similarly, when the fastener is loosened, it is necessary in each revolution to pass through positions where the relative rotation of the nut and screw meets greater opposition than at other positions.

Furthermore, in my preferred design, this fastener is highly resilient; so that excessive vibration and movement of the elements constrained should not induce any loosening beyond the first of these points of higher resistance; and the amount of this loosening would be negligible.

The simplicity of my invention is evident from the drawing in which:—

Figs. 1, 2 and 3 are, respectively, top, side and end views of a screw element on which two sections of the threaded portion are removed. For simplicity, throughout this application, I refer to this element as a bolt, screw or male member.

Figs. 4 and 5 are, respectively, side and top views of a nut member.

Figs. 6 and 7 are sections of a typical assembly.

Figs. 8 and 9 are, respectively, side and top views of a modified form of the nut member and of its manner of attachment to one of the elements fastened.

Fig. 6 illustrates this assembly with the nut and screw members at a period in their rotational relationship from which they cannot be moved in either direction without encountering increasing opposition.

Fig. 7 illustrates the effect on this assembly of rotating the screw through a quarter turn. It shows that the nut is distorted by an appreciably greater amount than it is in Fig. 6. While the screw may even be rotated in the direction that will eventually loosen the fastener, it is evident that during this quarter turn the fastener is actually tightened.

The nut member 9, as disclosed, is a spring piece attached to one of the elements that are to be constrained by this fastener and is spaced slightly therefrom. As the screw is brought into engagement with the nut, the face of the nut is substantially normal to the axis of the screw, thereby facilitating this engagement.

Figs. 4 to 7 show the spring nut attached to one of the parts to be fastened, by means of a spacing piece 10 and rivets 11. Figs. 8 and 9 show it as bent down at one end 19 and adapted to be attached by spot welds 15 or other suitable, integral attaching means.

The shank 16 of the male member is shown reduced, so as to move freely through threads 17 which may, optionally, be provided in one of the fastened elements, which threads are of the correct diameter and pitch to permit the passage of the threads 18 of said male member.

A person skilled in mechanical design can readily visualize a great number of variations in the design of the members comprising this fastener, without departing from the scope of this invention. For example, the nut may be merely a tapped hole in one of the elements to be constrained by the fastener. The nut may also be a rigid piece cooperating with a spring or resilient piece. Likewise, it might be a dished or deformed member; providing always that when the screw and nut are in engagement and pressure is used to hold the elements constrained; then during each relative rotation of the screw and nut there will be one position at which further movement in either direction tightens the fastener or otherwise increases the opposition to the relative rotation of the screw and nut.

It is also evident that the screw might be fastened to the element to be constrained and the nut rotated, or that both might be rotatable in the ordinary manner, if means be provided to hold one while the other is rotated.

In Figs. 6 and 7, I have shown a short thread 17 in the element constrained by the head of the screw. This is merely to retain the screw in this element when it is separated from the other.

The numerous advantages of this structure will be apparent. It is easily manufactured and assembled; and when securing elements frequently separated, for which use it is particularly adapted, each fastening member is always safely retained in contact with its associated element; preventing loss of small parts and remaining in position to be immediately refastened as soon as the elements to be secured are again brought into correct relation to each other. It will also be noted that, even if vibration should cause the parts of the fastener to pass one position of check, they will receive a similar check at each half-rotation of either part; in contradistinction to many fasteners which are practically completely released as soon as one locking position is passed.

Other advantages will be apparent to those skilled in the art; and I therefore impose no limitations upon the scope of this invention, except as expressed in the following claims.

I claim:

1. A fastener comprising a screw member and a nut member having separated points of engagement, each so shaped and arranged that when elements are constrained between said nut and the head of said screw there is a position in the rotational relationship of said members at which relative rotation in either direction increases the engaging pressure between the nut and the screw.

2. A fastener comprising a headed screw member and a nut member having diametrically disposed points of engagement, each member so shaped and arranged that when elements are constrained between said members there is a position at which relative rotation in either direction increases the engaging pressure between the nut and screw.

3. A fastener comprising a bolt and a nut having oppositely disposed points of engagement, each member so shaped and arranged that when elements are constrained between said nut and the head of said bolt there is an engaging position of said members at which rotation in either direction, of either bolt or nut, increases the resistance to such relative rotation.

4. A fastener comprising a male member and a female member having substantially diametrically disposed points of engagement, each member so shaped and arranged that, when engaged with the other, continued relative rotation in one direction through a full turn increasingly constrains elements interposed between said female member and the head of said male member, while continued rotation in the other direction through a full turn reduces this constraint; yet at a certain position in each rotation, a partial rotation in either direction increases this constraint.

5. In combination, a flattened screw and a spring nut, so shaped and arranged that, after being screwed together so as to exert pressure upon an element surrounding the stem of the screw, they will when unscrewed through one complete rotation, reduce this pressure; and will during this rotation, pass through a position where the pressure is lower than it is in adjacent positions on either side of said first-named position.

6. A fastener of the type described, comprising a relatively thin nut member, and a screw member from which material is removed on opposite sides, so shaped and arranged that, when engaged, there is one position where said nut member may pivot a limited amount on the remaining portions of the screw threads, to permit easier rotation in that position.

7. In a fastener of the type described, a screw member from the threads of which material is removed on opposite sides, a relatively thin nut member adapted to pivot slightly upon the remaining portions of said threads when engaged with parts to be secured thereby, and means adjacent to the nut and causing said nut to pivot upon said threads.

8. In a fastener of the type described, a relatively thin nut composed of resilient material and having at least one complete thread, a screw from which material has been removed along opposite side portions, and means interposed between said nut and the head of said screw such that when the fastener is tightened said nut is distorted across the major axis of the cross-section of the screw.

9. A threaded fastener comprising a male member having its thread oppositely interrupted for at least a portion of the length thereof, a resilient female member having an uninterrupted thread, and means for permanently spacing one side of said female member from the face of the element secured by said fastener, to cause distortion of said female member along its major axis as the members are relatively rotated.

10. A fastener comprising a headed bolt and a resilient nut, said bolt having an oppositely slabbed-off thread and said nut having an uninterrupted thread and means for inclining its axis to that of the bolt as the nut approaches the element or elements to be fastened, to distort said nut across the major axis of the cross-section of the bolt.

DANIEL DOUGLAS DEMAREST.